Figure 1:
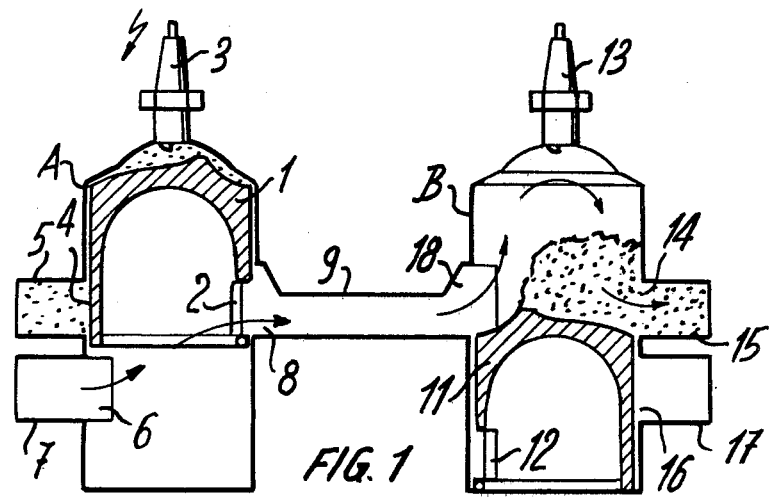

United States Patent [19]

Curtil

[11] 4,091,775
[45] May 30, 1978

[54] TWO-STROKE INTERNAL COMBUSTION ENGINE

[75] Inventor: Rémi Curtil, Eaubonne, France

[73] Assignee: Motosacoche S.A., Geneve, Switzerland

[21] Appl. No.: 782,030

[22] Filed: Mar. 28, 1977

[30] Foreign Application Priority Data

Mar. 31, 1976 Switzerland .................. 3987/76

[51] Int. Cl.² .................. F02B 75/20; F02B 33/04
[52] U.S. Cl. .................. 123/59 BM; 123/59 EC; 123/65 E; 123/73 AA; 123/119.7 A; 123/119 C
[58] Field of Search .......... 123/59 B, 59 BM, 59 BA, 123/59 EC, 65 E, 65 WV, 70 R, 72, 73 R, 74 R, 73 AA, 119 A, 119 C; 60/312–314

[56] References Cited

U.S. PATENT DOCUMENTS

| 880,024 | 2/1908 | Hay | 123/73 AA |
|---|---|---|---|
| 2,123,325 | 7/1938 | Zeissl | 123/70 R |
| 2,708,425 | 5/1955 | Tenney | 123/73 AA |
| 3,974,804 | 8/1976 | Curtil | 123/59 BM |

FOREIGN PATENT DOCUMENTS 594,891  9/1925  France .................. 123/59 B

*Primary Examiner*—Charles J. Myhre
*Assistant Examiner*—Craig R. Feinberg
*Attorney, Agent, or Firm*—Emory L. Groff, Jr.

[57] ABSTRACT

The intake ports of the combustion chambers of two alternately-operating cylinders of a two-stroke internal combustion engine are connected by a conduit which sets up temporary communication between the two cylinders. In operation, while the piston of one cylinder is at the top dead center, explosive mixture is sucked via an opening in the skirt of the piston and through said conduit to scavenge the other cylinder. During the driving stroke of the first cylinder, just before opening of the exhaust, its piston uncovers the intake port so that the residual energy of the combustion gases supercharges the explosive mixture in the other combustion chamber.

5 Claims, 6 Drawing Figures

U. S. Patent  May 30, 1978  Sheet 1 of 2  4,091,775

TWO-STROKE INTERNAL COMBUSTION ENGINE

The invention relates to two-stroke internal combustion engines, of the type comprising at least one group of two alternately-operating cylinders each cylinder housing a piston and defining, with the piston, a combustion chamber, each combustion chamber having exhaust means and an intake port.

An object of the invention is to improve such an engine by enabling scavenging without a need for a scavenging blower or a preliminary compression of the cool gas in the cylinder casing.

According to the invention, such an engine is characterized in that the two combustion chambers are connected together by a conduit each end of which leads into the respective intake ports which, in operation, have overlapping opening times to provide a temporary communication between the two working chambers. Means for the intake of cool gas are provided in each cylinder below the piston to deliver cool gas from the exterior through said conduit towards the cylinder to be scavenged via an opening provided in the skirt of each piston which openings come to face the intake ports in a zone situated on either side of its top dead center, whereby the residual energy of the exhaust gas of one cylinder is used to supercharge the other cylinder and then actuate scavenging of its own cylinder.

Figure 3:
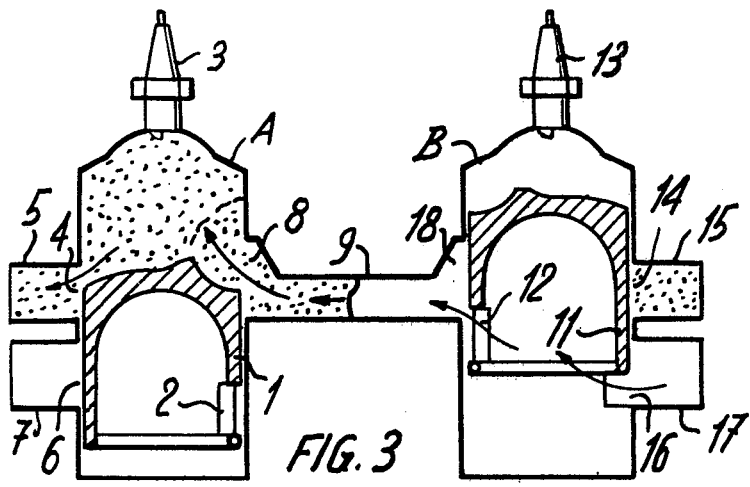
Figure 4:
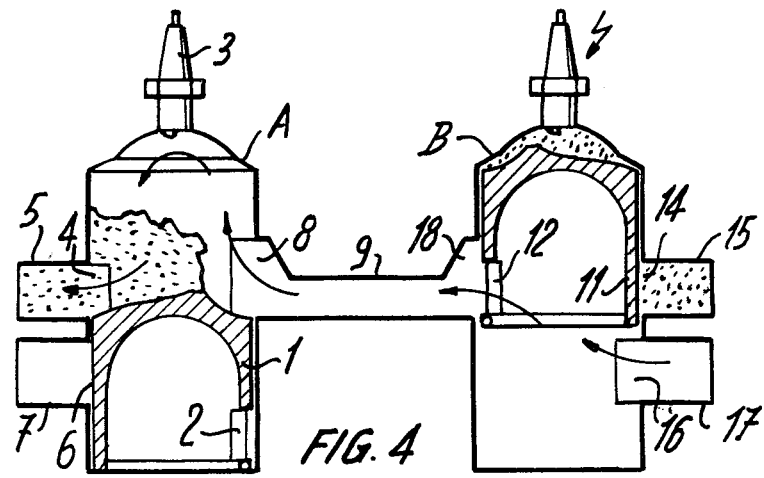
Figure 5:
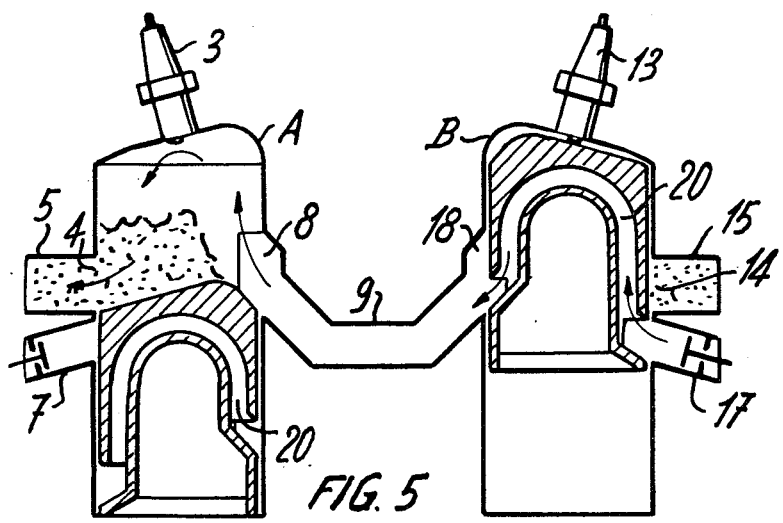
Figure 6:
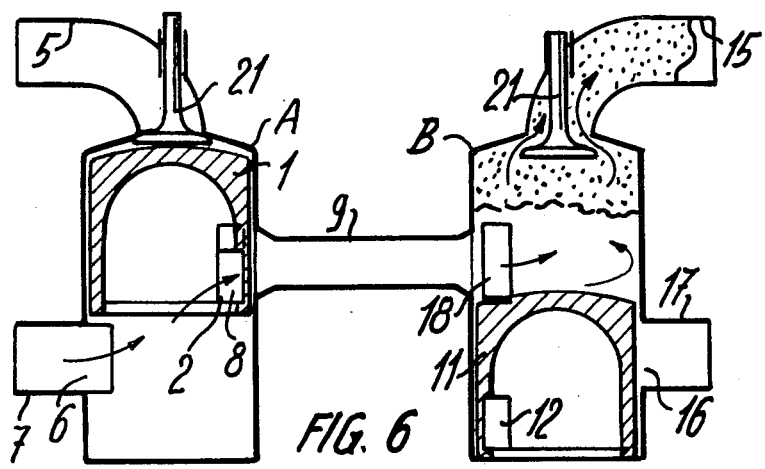

The accompanying drawings show, schematically and by way of example, three embodiments of the invention. In the drawings:

FIGS. 1 to 4 show the first embodiment at four different moments of its operative cycle; and FIGS. 5 and 6 show two further embodiments.

With reference to FIGS. 1 to 4, a transversally-scavenged internal combustion engine comprises two cylinders A and B in which pistons 1 and 11 reciprocate alternately.

Cylinder A is fitted with a spark plug 3 and has an exhaust port 4 leading into an exhaust pipe 5, as well as an intake port 6 corresponding to a pipe 7 for delivering an explosive mixture of cool gases. The port 6 is situated low in the cylinder so that it never opens into the ignition chamber. Cylinder A also has a communication port 8 at the end of a conduit or pipe 9 for setting up temporary communication with cylinder B.

The cylinder B is constructed in the same manner as cylinder A and has ports 14, 16 and 18 corresponding to ports 4, 6 and 8 of cylinder A. Ports 14 and 16 have corresponding exhaust and intake pipes 15, 17 respectively. Ignition is achieved by a spark plug 13. The ports 8, 18 may be uncovered either by the respective piston 1, 11 when it is in the lower position, or by an opening 2, 12 in a skirt of the respective piston 1, 11 when it is in the upper position.

FIG. 1 shows the position of the pistons at the moment of ignition in cylinder A and scavenging of cylinder B. Cylinder A is thus in its driving stroke and the hot gases produced by ignition push piston 1 downwards, while piston 11 moves up from its bottom dead center and enters its compression stroke.

Figure 2:
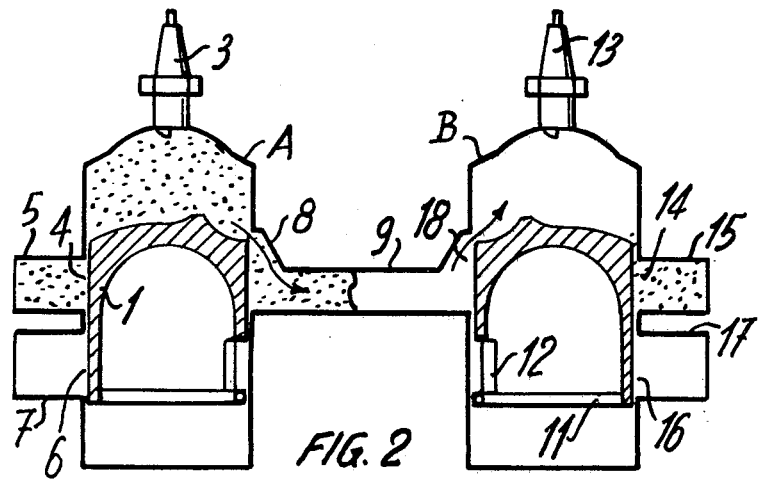

As shown in FIG. 2, during the downward movement of piston 1, it uncovers the port 8 before it begins to uncover the exhaust port 4. At the moment of opening of port 8 of cylinder A, the piston 11 of cylinder B has already closed its exhaust port 14, but has not yet obturated port 18. As a result, the gases under pressure in cylinder A pass along pipe 9 pushing the cool gases in this pipe. These cool gases thus penetrate under pressure in cylinder B and hence supercharge this cylinder.

FIG. 3 shows the position in which the piston 1 is approaching its bottom dead center, while piston 11 is in its compression stroke. Piston 1 has now uncovered the exhaust port 4 so that the exhaust gases are removed via pipe 5. In an intermediate position between the positions shown in FIGS. 2 and 3, the port 18 was still closed at the instant when the piston 1 began to open port 4. The cool and burnt gases which are contained under pressure in the pipe 9 are thus expelled into cylinder A which is connected to the exhaust. At the moment when the opening 12 of piston 11 arrives facing port 18, the greater part of the gases in pipe 9 is already in movement towards the exhaust pipe 5; this movement, combined with that of the burnt gases escaping directly from the cylinder A through pipe 5, creates a suction in the pipe 9. This suction thus sucks in cool gases from the pipe 17 because the intake port 16 of pipe 17 is uncovered by the piston 11 as it approaches its top dead center.

FIG. 4 shows the position when the piston 1 of cylinder A arrives at its bottom dead center, i.e. substantially during the middle of the scavenging phase. The explosive mixture delivered by pipes 17 and 9 has acquired a certain speed and ensures scavenging of cylinder A after having scavenged the pipe 9. Hence, the ports 8 and 18 play a combined role of temporary communication ports and ports for the intake of explosive mixture into the combustion chambers of the respective cylinders.

FIG. 4 shows the pistons in the reverse position to that of FIG. 1, i.e. piston 1 occupies the position occupied by piston 11 in FIG. 1, and piston 11 occupies the position of piston 1 in FIG. 1. Hence, the above description concerns half of a full cycle; the other half of the cycle of each cylinder corresponds to the above description concerning the opposite cylinder.

In the embodiments shown in FIGS. 5 and 6, the same parts are designated by the same references as before.

FIG. 5 shows an embodiment in a position corresponding to FIG. 4. This embodiment differs from the first embodiment in that a duct 20 is provided in the body of each piston for the connection of the intake pipes 7, 17 to the communication ports 8, 18. As shown for the cylinder B of FIG. 5, the explosive mixture of cool gases passes through this duct 20 during the scavenging phase, which hence improves cooling of the piston.

Also, the engine of FIG. 5 has an automatic valve in each intake pipe 7, 17. This automatic valve opposes reverse movement of the cool gas (i.e. from the cylinder back into the pipe 7 or 17), which enables excellent scavenging of the engine at all speeds. In effect, in the embodiment of FIGS. 1 to 4, the closure of port 18 which is produced just after the phase shown in FIG. 2 generates shock waves in the column of gases in the pipe 9; hence, depending on the speed of running of the engine, i.e. the time between the beginning of a shock wave and the scavenging phase, the column of gas could, at the moment of scavenging, be moving in the opposite direction to that desired, which evidently would perturb regular running of the engine.

To reduce the intensity of the above-mentioned phenomenon, other modifications of the engine may be provided. In particular, the ports 8, 18 could be connected not by a single pipe 9 but by several pipes of different length, in a manner to avoid reversal of the direction of flow at certain speeds of the engine, or with certain loads.

The third embodiment shown in FIG. 6 operates in an analogous manner to the first embodiment. However, in FIG. 6, the walls of cylinders A, B do not have an exhaust port, the exhaust gases being removed by exhaust pipes 5, 15 leading into the cylinder heads. Control of opening and closing of the exhaust pipes is provided by a valve 21 in each cylinder head and controlled by conventional means, not shown.

In this manner, each combustion chamber is scavenged by a current of the explosive mixture delivered into the bottom of the combustion chamber and moving up through this chamber. Hence, scavenging is achieved in excellent conditions, in a known manner. Moreover, each communication port 8, 18 is arranged in such a manner that the scavenging current has a tangential component as it enters the combustion chamber. As a result, the explosive mixture delivered to the combustion chamber has a helicoidal movement which contributes to effective scavenging and additionally produces turbulence favorizing rapid combustion.

In all instances, the supercharging obtained by the temporary communication between the twin cylinders creates turbulence which favors good combustion. In all the embodiments, the pipes 7, 17 could deliver cool air, the fuel being injected in pipe 9, thus enabling the use of a single injection means for the two cylinders. Of course, an engine could comprise several units each having two cylinders.

Automatic valves, as those shown in FIG. 5, could be provided in the pipes 7, 17 of the other embodiments.

Finally, it is also possible, with a view to reducing unwanted reflexion of the exhaust wave in pipe 9, to provide a pocket-shaped recess adjacent each end of pipe 9. Such recesses may also be provided in the pistons and arranged so that they face the ports 8, 18 during the phase of temporary communication. Preferably, such recesses may open into the pipe 9 by an orifice of considerably smaller section than the maximum inner cross-section of the recess.

I claim:

1. In a two-stroke internal combustion engine comprising at least one group of two alternately-operating cylinders each cylinder housing a piston and defining, with the piston, a combustion chamber, each combustion chamber having exhaust means and an intake port, the improvement comprising: a conduit connecting the two combustion chambers, said conduit having two ends leading into the respective intake ports of the two combustion chambers, said intake ports being arranged to be temporarily simultaneously uncovered by their pistons to provide a temporary communication of the two combustion chambers; and means in each cylinder, opposite the combustion chamber in relation to the piston, for the intake of cool gas; each piston having a skirt and means defining in the skirt, at an angular location aligned with said intake port of the respective combustion chamber, an opening which, in operation, when the respective piston approaches a top dead center position faces said intake port for the delivery of cool gas from the intake means of its cylinder via said conduit to scavenge the combustion chamber of the other cylinder; whereby when in operation, said piston moves down from said top dead center position and uncovers its intake port, the residual energy of exhaust gases of said combustion chamber supercharges cool gases delivered to the other combustion chamber and then actuates scavenging of its own combustion chamber via its exhaust means.

2. An engine according to claim 1, in which said intake means of each cylinder comprises a pipe for the delivery of cool gas, and automatic valve means opposing expulsion of cool gas from the cylinder into said pipe.

3. An engine according to claim 1, in which said opening in each skirt communicates with a cooling duct defined in the piston, said duct cooperating with said intake means of the cylinder.

4. An engine according to claim 1, in which said conduit comprises several pipes of different lengths connecting said intake ports.

5. An engine according to claim 1, in which said conduit comprises, adjacent each end, means defining a pocket-like recess for absorbing reflexion of a wave front of the exhaust gases and inducing scavenging of the conduit in the desired direction.

* * * * *